United States Patent [19]

Lamb

[11] Patent Number: 4,621,496

[45] Date of Patent: Nov. 11, 1986

[54] ACTUATOR CONTROL SYSTEM

[75] Inventor: C. Paul Lamb, Dallas, Tex.

[73] Assignee: Teledyne Industries, Inc., Garland, Tex.

[21] Appl. No.: 601,902

[22] Filed: Apr. 19, 1984

[51] Int. Cl.[4] .......... F16D 31/02

[52] U.S. Cl. .......... 60/479; 60/486; 91/6; 251/26; 251/29; 417/425; 417/426

[58] Field of Search .......... 417/374, 425, 398, 390, 417/426, 401, 402, 399; 60/479, 486, 477, 402, 478; 92/13.6; 70/264; 91/454, 6, 469; 251/25, 26, 29

[56] References Cited

U.S. PATENT DOCUMENTS

| | | | |
|---|---|---|---|
| Re. 25,873 | 10/1965 | Rutherford | 92/13.6 X |
| 818,382 | 4/1906 | Lemp | 417/425 X |
| 2,211,249 | 8/1940 | Werner | 60/481 |
| 2,927,432 | 3/1960 | Parry | 91/6 |
| 2,960,828 | 11/1960 | Gould | 60/486 X |
| 3,021,890 | 2/1962 | Donini | 417/390 X |
| 3,141,415 | 7/1964 | Chute | 417/374 |
| 3,175,473 | 3/1965 | Boteler et al. | 92/130 A |
| 3,299,827 | 1/1967 | Ferrari et al. | 92/13.6 X |
| 3,572,979 | 3/1971 | Morton | 417/390 |
| 3,720,487 | 3/1973 | Wiley | 417/572 |
| 3,863,446 | 2/1975 | Giwosky | 251/25 X |
| 3,932,065 | 1/1976 | Ginsberg et al. | 417/399 X |
| 4,102,128 | 7/1978 | Shafer et al. | 60/402 X |
| 4,181,191 | 1/1980 | Hoffmann et al. | 70/264 X |
| 4,270,371 | 6/1981 | Kalk | 70/264 |
| 4,273,027 | 6/1981 | Reinhard et al. | 91/6 X |
| 4,414,882 | 11/1983 | Frei | 251/25 X |
| 4,441,862 | 4/1984 | Vogel | 417/374 X |

FOREIGN PATENT DOCUMENTS

| | | | |
|---|---|---|---|
| 2111645 | 9/1971 | Fed. Rep. of Germany | 417/398 |
| 1463257 | 2/1977 | United Kingdom | 417/398 |

*Primary Examiner*—Edward K. Look

*Attorney, Agent, or Firm*—John F. Booth; Gerald G. Crutsinger; Norman L. Gundel

[57] ABSTRACT

An actuator control system is disclosed using fluid dispensing means to selectively add or remove fluid from a closed actuator system, whereby the movement of the actuator is volume rather than pressure responsive.

4 Claims, 5 Drawing Figures

ACTUATOR CONTROL SYSTEM

TECHNICAL FIELD

The present invention relates to actuator systems for use in accurately and reliably controlling the position of a follower such as a valve. By way of example, the actuator system can be used to provide incremental positive positioning of a choke valve on a petroleum well.

BACKGROUND OF THE INVENTION

One use of actuator control systems wherein accurate, positive and reliable control is required, is in the regulation of liquid and/or gas flow. In this environment, actuators are utilized to position a valve or choke to regulate the flow of liquid through the valve. The controller is used to selectively position the valve between the open or closed position to regulate flow rate, differential pressure across the valve, upstream pressure, downstream pressure or one or more of the above factors. Control actuated valves are used in the petroleum well environment wherein operating parameters vary drastically and reliable and accurate control is critical. An example is in the use of choke valves in the production of petroleum products from wells. To maximize the efficiency in some wells, it is necessary to control the production of the well so that, for example, the well pressure does not fall below a minimum which would result in damage to the well's ability to produce. In others the flow rate is controlled to minimize sand contamination. A difficulty in continuously, accurately and reliably controlling the pressure or flow of the well can be seen when one considers the severe environmental factors which are present in a well. For example, the downhole or supply pressure of a producing well can vary severely and, therefore, any actuator system used to control the choke valve must be able to function reliably and accurately to position the valve.

In other uses, an actuator control choke valve is used during drilling to maintain a given working pressure while continuously circulating the drilling fluids. In these uses loss of circulation of drilling fluid can damage the well. These chokes operate at pressures as high as 20,000 pounds per square inch.

One conventional method of actuating a control valve is to utilize a motor such as a DC stepping motor. The forces necessary to actuate the valve through the entire operating pressure range require the use of a gear train or rachet to connect the motor to the valve stem. This motor can provide a positive incremental input into the gear train or rachet which input can be relatively independent of the operating pressures acting upon the stem of the choke valve. However, due to the inherent backlash in gear trains and rachets, error is induced into the accuracy of positioning the valve.

In an attempt to overcome the errors induced into a control valve by variations in well pressure, partially balanced stem valves have been designed. These semi-balanced stem valves have complicated valve, valve seat and stem designs and attempt to balance the pressures acting on the stem whereby variations in the forces acting upon the valve stem due to changes in operating pressure are minimized. In some prior art systems a hydraulic or pneumatic actuator is coupled to a semi-balanced stem valve and a pressure differential across the piston of the actuator is created to control the position of the actuator and valve. Since the actuator is directly coupled to the stem of the valve, the inherent error of the gear train is eliminated. However, since the actuator position is a function of the differential pressure across the piston of the actuator, forces induced on the piston of the actuator from the stem of the control valve by reason of variations in the flowing or controlled pressure induce positioning errors in the system.

In other systems, single acting spring bias hydraulic or pneumatic actuators are directly coupled to somewhat balanced stem valves and the pressure on one side of the actuator is regulated. Like the double acting systems, these systems are pressure controlled and variations in the control of the supply pressure as well as the dynamic forces acting on the valve trim and stem induce errors into the systems performance.

DISCLOSURE OF THE INVENTION

An actuator control system is provided for accurately and reliably positioning a follower even though the forces operating on the follower may vary. The system utilizes a high pressure manifold of a fixed volume for containing a fixed volume of incompressible fluid. The high pressure manifold is coupled to a variable volume actuator. The actuator is biased to compress the fluid in the actuator. Pump means is provided for selectively adding a set volume of incompressible fluid to the high pressure manifold-actuator system. Pump means is provided for selectively removing a set volume of fluid from the high pressure manifold-actuator system. In one embodiment two pumps are used; in other embodiments, only one is used. By selectively adding or removing a volume of incompressible fluid to and from the high pressure manifold-actuator system, the position of the actuator and follower (valve) can be positively controlled whereby the forces induced upon the stem and in turn on the actuator do not affect the position of the piston as they do in a pressure regulated system. Thus, operation is isolated from variations in the supply pressure.

The system contemplates the use of a positive displacement type pump to add or remove fluid from the high pressure manifold. It is preferred that the pump be pneumatically actuated. The pump volume per stroke can be selectively varied. Solenoid control valves are utilized to selectively supply pneumatic pressure to the pump.

The system uses a spring loaded solenoid control valve to operate a pneumatically controlled normally closed valve to dump the fluid from the high pressure manifold-actuator system to provide for fast closing of the choke valve when required. In addition, because the high pressure manifold-actuator fluid system is closed, a loss of control power maintains the valve in position.

The system can be used in remote locations such as offshore platforms and can be coupled to a controller such as a computer to control a multiplicity of wells at remote locations.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
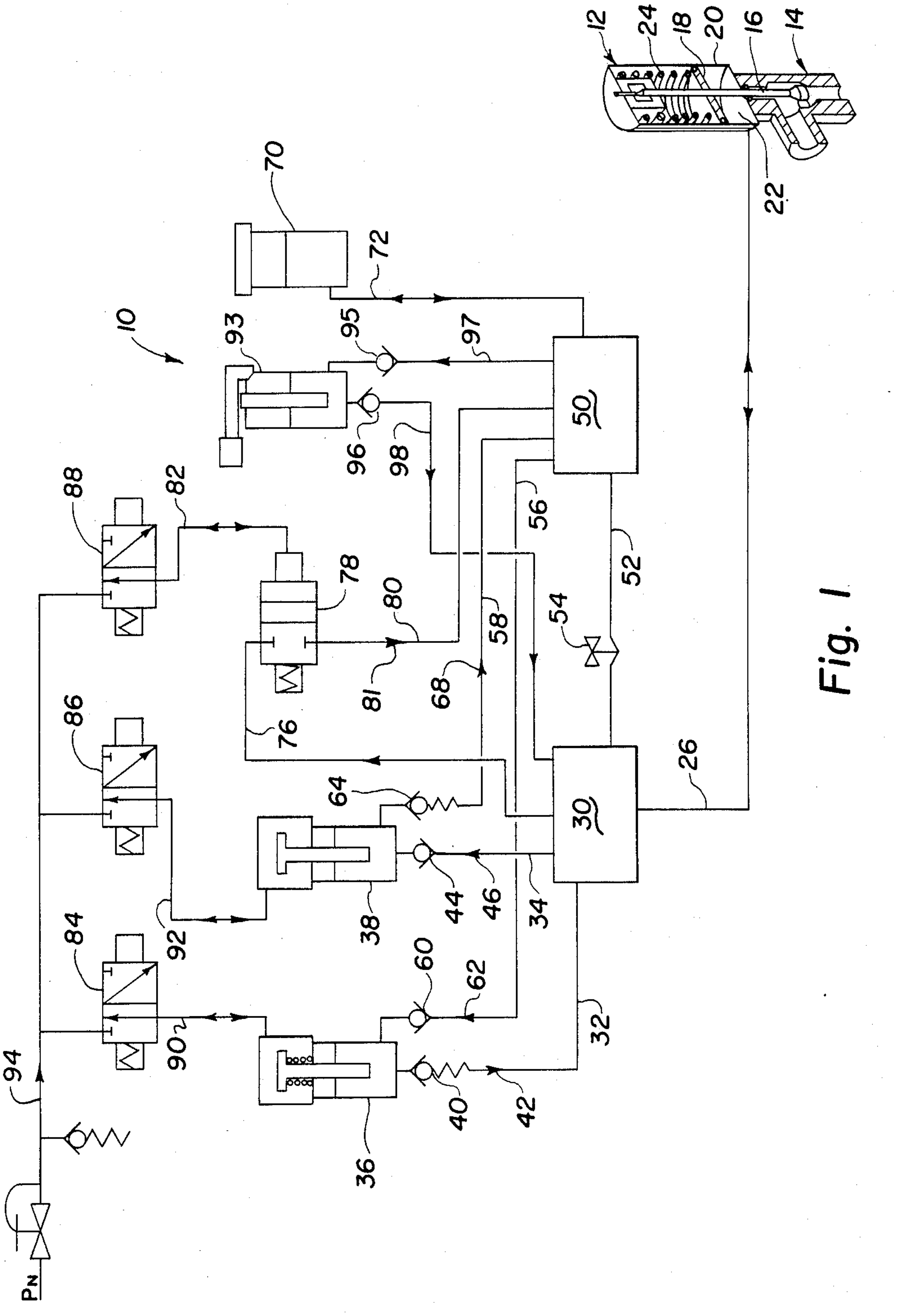
FIG. 1 is a fluid schematic of one embodiment of the control system of the present invention.
Figure 2:
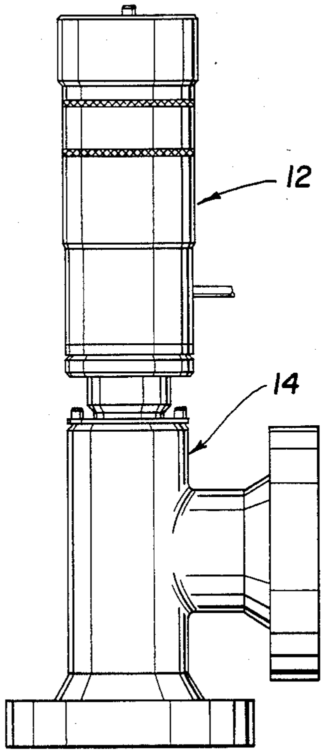
FIG. 2 is an elevation view of an actuator choke valve assembly.

Referring now to the drawings wherein like reference characters designate like or corresponding parts, there is illustrated in FIG. 1 a schematic of the control system of the present invention which is generally designated by reference numeral 10 for purposes of description. The system 10 comprises an actuator 12 which is mounted on and coupled to the stem of a choke valve 14. Although the valve 14 is not shown in detail, it is to be understood, of course, that it is of a type which is biased to a closed position and preferably designed to minimize the variation in forces induced upon the stem 16 by reason of variations in operating pressures within the valve. It is envisioned that stem valves of this type can be utilized in pressure environments which vary, for example, in a range of 0 to 20,000 psi.

The actuator 12 comprises a piston 18 mounted for reciprocal movement within a cylinder 20. The piston is provided with appropriate seals and defines a variable volume chamber 22 below the piston. The piston is biased by a resilient compression element 24 such as a spring to cause the piston to move in a downward direction as shown in FIG. 1 to tend to reduce the size of the volume chamber 22. The piston 18 is directly connected to the stem 16 of the valve 14 whereby movement of the piston within the cylinder causes corresponding movement of the valve carried on the valve stem in and out of its respective seat in the valve 14. A suitable seal can be provided around the stem to isolate the interior of the valve from the chamber 22.

A conduit 26 is coupled between chamber 22 and a high pressure distribution block 30. As used herein conduit is used in its generic sense and is intended to include all types of fluid conduits such as internal bores and passageways, flexible and rigid tubular members and the like. In this regard a single manifold with internal ports and passageways could be used to replace conduits schematically shown in the figures.

The distribution block 30 and associated fluid conduits are referred to herein collectively as a high pressure manifold. The variable volume 22, high pressure manifold (including its associated conduits) are filled with an incompressible fluid such as Ultra Glide, Gold Standard, manufactured by Ultraglide Limited, Angus, Scotland. It is envisioned, of course that other incompressible fluids could be used. As will be described in detail, this variable volume 22 and the high pressure manifold form a closed system into which and from which fluid can be added or removed as desired to vary the size of the volume 22 and in turn the position of piston 18 and valve stem 16.

According to a particular feature of the present invention, distribution block 30 is coupled through conduits 32 and 34 to input and discharge pumps 36 and 38 respectively. A pressure responsive check valve 40 permits the flow of fluid from the chamber of the pump 36 in the direction of arrow 42 to distribution block 30 while preventing the flow of fluid in the reverse direction. In addition, check valve 40 allows the flow of fluid in the direction of arrow 42 from the chamber of pump 36 to the high pressure distribution block 30 when the pressure in the chamber of pump 36 exceeds a predetermined minimum. For example, check valve 40 will open to allow flow of fluid only in the direction of arrow 42 and only when the pressure in chamber 36 exceeds the set minimum. Conduit 34 likewise has a check valve 44 therein to permit the flow of fluid through conduit 34 only in the direction of arrow 46 from the high pressure manifold to the chamber of pump 38.

A low pressure distribution block 50 is provided and is coupled to the high pressure manifold through a conduit 52 having a normally closed manual valve 54 therein. When normally closed, valve 54 prevents the flow of fluid between the high pressure manifold and the low pressure distribution block 50. Low pressure fluid distribution block 50 is also connected to input pump 36 and discharge pump 38 through conduits 56 and 58, respectively. Conduit 56 has a check valve 60 which allows the free flow of fluid in the direction of arrow 62 from distribution block 50 to the chamber of pump 36. The pressure of the fluid within distribution block 50 is lower than the pressure within conduit 32 and therefore is not sufficient in and of itself to open the check valve 40.

Conduit 58 has a pressure relief check valve 64 therein which allows the flow of fluid only in the direction of arrow 68 from the chamber of pump 38 to the low pressure distribution block 50. Relief check valve 64 is of the type which only opens when the pressure differential across the valve exceeds a set amount. It is to be appreciated that the pressure differential between the fluid in distribution block 30 and distribution block 50 in and of itself is not sufficient to open the relief check valve 64 or to allow fluid to flow from the chamber of the pump 38 to distribution block 50. Thus, the valve 54 and check valves 40 and 64 isolate the fluid in the high pressure manifold and distribution block 30 from the fluid in the low pressure distribution block 50.

A reservoir of fluid 70 is coupled through conduit 72 to the low pressure distribution block 50 to insure an adequate supply of fluid.

High pressure distribution block 30 and low pressure distribution block 50 are also interconnected by a conduit 76, a normally closed spring loaded pressure actuated valve 78 and conduit 80. Valve 78 opens when pneumatic control pressure is applied to the valve 78 through conduit 82. With the valve open, fluid is allowed to dump directly from high pressure distribution block 30 to low pressure distribution block 50 in the direction of arrow 81.

Three normally closed electrically actuated solenoid valves 84, 86, and 88 are provided. Valve 84 is connected through conduit 90 to selectively operate pump 36. Valve 86 is connected through conduit 92 to selectively operate the pump 38. Valve 88 is coupled to valve 78 through conduit 82 to selectively operate valve 78. Valves 84, 86 and 88 are normally closed and are coupled through conduit 94 to a pressure source Pn such as a 100 psi compressed air. Suitable electrical switches and circuitry are provided to selectively operate solenoid valves 84, 86 and 88 to open the valves to in turn selectively supply pressure to conduits 90, 92 and 82, respectively.

To manually actuate the system, a hand pump 93, and associated check valves 95 and 96 are coupled through conduits 97 and 98 to allow fluid to be manually pumped from low pressure distribution block 50 to high pressure distribution block 30. Valve 54 provides a means for manually bleeding fluid from high pressure distribution block 30 to low pressure distribution block 50.

Pump 36 is pneumatically operable, as will be described in more detail in reference to FIG. 3. Pump 36 has a chamber and a plunger which is spring loaded to normally fill the chamber. When pneumatic pressure is applied to pump 36, a piston in the pump causes the plunger to move from the position shown in FIG. 3 to compress the spring and pump fluid to flow through check valve 40 and conduit 32 into the high pressure manifold actuator system. Pressure fluid is selectively applied to the pump through conduit 90 by the operation of valve 84. When the valve 84 is closed, the pressure fluid in line 90 is allowed to discharge to the atmosphere or to any lower pressure container, thus allowing the spring within the pump 36 to return the plunger to the at rest position and fill the chamber of the pump 36 with fluid through the check valve 60.

Pump 38 is likewise a pressure actuated positive displacement pump, however, it is not spring loaded and the pressure of fluid in high pressure distribution block 30 normally flows through conduit 34 in the direction of arrow 46 and through check valve 44 to maintain the chamber of valve 38 filled with fluid as long as the valve 86 remains unactuated. Once the valve 86 is actuated, valve 86 supplies pressure through conduit 92, a piston in pump 38 causes the plunger of pump 38 to move down into the chamber and discharge the fluid in the chamber through relief check valve 64 by reason of the fact that the pump pressure exceeds the relief pressure of valve 64.

Valve 88 can be electrically actuated to supply pneumatic pressure to line 82 which in turn opens valve 78 as previously described to dump the high pressure fluid from distribution block 30 to distribution block 50.

According to a particular feature of the present invention, the volumes of fluid discharged from the chambers of pumps 36 and 38 can be varied and the actuation of either pump 36 or 38 causes a change in the volume of the chamber 22 by one unit of volume of the fluid displacement of the actuated pump. The pumps 36 and 38 when actuated, respectively, add or remove a volume of fluid from the high pressure manifold-actuator system which volume is independent of the forces applied through the valve stem 16 and piston 18. By adding a preset volume of fluid by use of pump 36 and discharge of preset volume of fluid by pump 38 the movement of the actuator 12 can be accurately and selectively controlled without regard to changes in the forces acting upon valve stem 16 by reason of variations in operating pressures within the valve 14.

The details of the construction of the input pump 36 will be described by reference to FIG. 3. The pump 36 has a metering chamber 100 which is coupled to conduit 32 through previously described check valve 40 and to conduit 56 through previously described check valve 60. Chamber 100 has a radially extending port 102 to which the conduit 56 is coupled to provide fluid communication between the metering chamber 100 and conduit 56. The metering chamber 100 is formed within a lower cylindrical pump body 104 which body has an enlarged portion at its upper end. The enlarged portion is threadedly coupled at 106 to an upper pump body 108. The upper end of chamber 100 is provided with a suitable annular seal 110 through which a pump plunger 112 extends in sliding sealing contact. An annular shoulder 114 is formed between the metering chamber 100 and enlarged concentric counterbore 116. A retainer ring or other suitable fastener 118 mounts check valve assembly 40 in the counterbore 116. A suitable seal is provided to seal between the counterbore 116 and the body 120 of valve assembly 40. The valve body 120 has a frusto conical valve seat and a spring loaded ball valve which acts as a pressure responsive check valve as previously described to allow the flow of fluid in the direction of arrow 42 when the pressure within the chamber 100 exceeds the pressure in chamber 22. The upper pump body 108 defines a cylindrical chamber 122 therein. A piston 124 is positioned in the chamber 122 for axial reciprocation therein. The piston 124 carries a suitable annular seal for sealing the annulus between the piston 124 and the wall of the chamber 122. A variable volume pneumatic actuation chamber 126 is formed above the piston 124. The plunger 112 is coupled through a pin 128 to piston 124 whereby axial reciprocation of the piston 124 is imparted to the plunger 112.

A suitable cylinder head 130 is mounted in a counterbore 132 formed in the upper end of the upper pump body 108. The head 130 carries suitable seals to seal the annulus between the head 130 and the interior of the counterbore 132. A radial port 133 is formed in the upper end of the head 130 and provides fluid communication to the interior of the actuating chamber 126. Pressure fluid supply conduit 90 is in turn coupled to the port 133 for providing a supply of pressure fluid to the chamber 126. A bolt 134 extends through a threaded opening 136 in the upper end of the head 130. The axial extent of the bolt 134 into the head and in turn into the chamber 132 can be adjusted by threading the bolt into and out of the chamber 122. This bolt 134 acts as an upward stop to contact the piston 124 to limit its travel in the upward direction and in turn limit the travel of plunger 112 in the upward direction. Suitable seals 138 and lock nut 140 are provided on the bolt 134 to seal the threaded opening 136.

As can be seen, piston 124 is normally in its uppermost position the extent of which is limited by the bolt 134 by reason of a resilient force applied by compression spring 142. It is to be noted that the pressure affected area of piston 124 is larger than the effective area of the plunger 112 and therefore a low pressure in chamber 126 can create a higher pressure in chamber 100.

Figure 3:
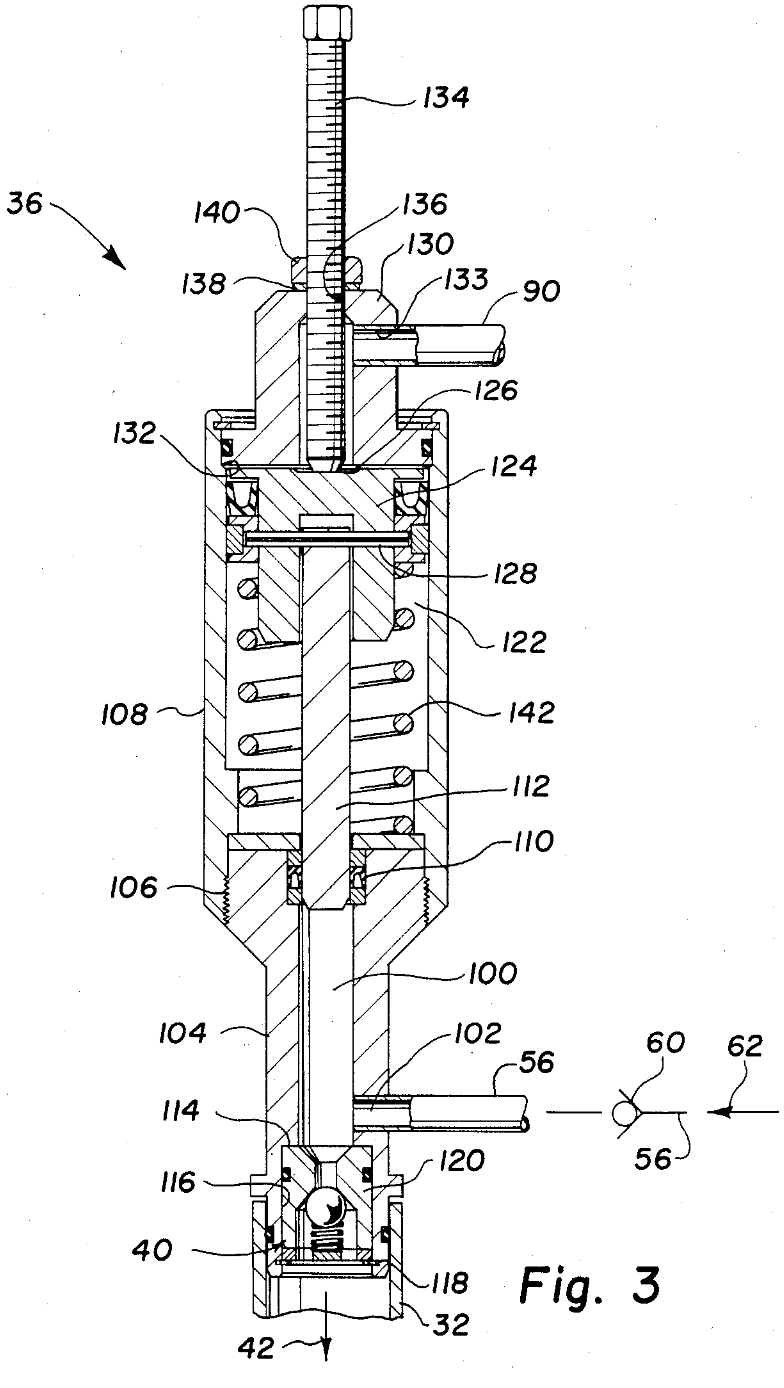
FIG. 3 is a sectional view of the positive displacement fluid pump of the present invention used to add fluid to the high pressure manifold.

With the pump 36 in its normal at rest position shown in FIG. 3, fluid flowing in the direction of arrow 62 through check valve 60 will fill the metering chamber 100. The maximum volume of fluid in chamber 100 can be altered by presetting the axial extent of the bolt 134 and thus limiting the travel of the plunger 112 in the upper direction. When pressure is applied to conduit 90 and chamber 126 the pressure urges the piston 124 in a downward direction as shown in FIG. 3. This downward movement will raise the pressure within chamber 100 and discharge a metered volume of fluid from the chamber 100 and into the conduit 32 in the direction of arrow 42. The movement of fluid back through conduit 56 is prevented by check valve 60 and therefore a preset volume of fluid can be selectively added to the high pressure manifold as the piston 124 and plunger 112 reach the lowermost extent of downward travel. Once the piston reaches its lowermost extent of travel, pressure is removed from conduit 90 and vented to the atmosphere or any low pressure reservoir. Spring 142 will then urge piston 124 to return to the position shown in FIG. 3. The fluid discharged from the chamber 100 is prevented from returning by check valve 40 and fluid from the low pressure reservoir is allowed to fill the chamber 100 through conduit 56 and check valve 60.

Thus, the pump 36 when actuated will supply a metered volume of fluid into the high pressure manifold-actuator system independent of variations in supply pressure or valve stem forces.

The details of construction of the discharge pump 38 will be described by reference to FIG. 4. Pump 38 is identical in construction to pump 36 except as described herein. The pump 38 has a metering chamber 200 formed within a lower pump body 204 and an upper pump body 208 forming an actuator chamber 226. Conduit 92 is in turn connected to the actuating chamber 226 and when pressure is applied to conduit 92 the piston 224 is caused to move in a downward direction carrying with it plunger 212. Pump 38 differs from pump 36 in that pump 38 does not have a spring in chamber 222 urging the piston 224 in an upward direction. In pump 38 the piston 224 and plunger 212 are free to axially reciprocate within their respective chambers.

In addition, the pump 38 differs from the pump 36 in that the check valve 44 in the bottom of pump 36 is reversed in direction in the bottom of pump 38. Thus, the check valve 44 in the bottom of pump 38 freely allows the flow of fluid from the high pressure manifold system in the direction of arrow 46 through conduit 34 and into the chamber 200. The chamber 200 of pump 38 is in fluid communication with conduit 58 and pressure relief check valve 64. Pressure relief check valve 64 is preset such that the differential pressure between the high and low pressure manifold will not open the valve and therefore the flow of fluid from the chamber 200 in the direction of arrow 68 through valve 64 is prevented by valve 64 until the differential pressure across valve 64 exceeds the differential pressure between the high pressure and low pressure manifolds. Thus, high pressure fluid is free to flow through conduit 34, check valve assembly 44 and into chamber 200, however, is prevented from flowing through conduit 58 to the low pressure manifold by reason of the pressure relief check valve 64. As previously described, the pressure relief check valve assembly 64 is set to open when a preset differential pressure between the chamber 200 and the low pressure manifold is present across the valve thus allowing the free flow of fluid from chamber 200 in the direction of arrow 68 into distribution block 50.

Figure 4:
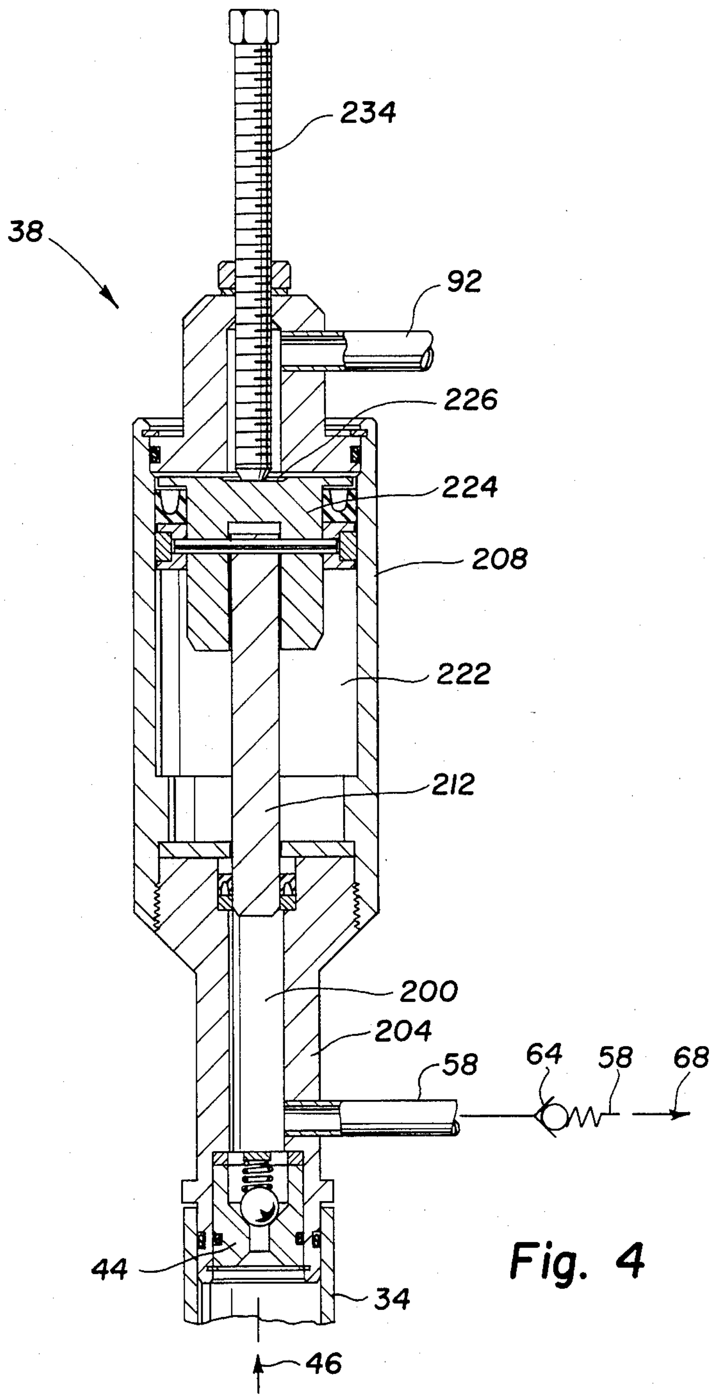
FIG. 4 is a sectional view of a positive displacement fluid pump of the present invention utilized to remove fluid from the high pressure manifold.

The supply of pressurized fluid from conduit 34 into chamber 200 acts upon a plunger 212 and in turn causes it to be normally positioned as shown in FIG. 4 in its upward extent of movement as limited by the bolt 234. When pressure is applied to chamber 226 through conduit 92, the piston 224 will be urged in a downward direction along with plunger 212. As the pressure in chamber 200 is increased by the downward force of plunger 212, the pressure relief check valve 64 is overcome and a metered volume of fluid is discharged through the valve 64 from chamber 200. The metered volume is determined by the fluid displaced by plunger 212 during its downward travel. Upon completion of the downward travel of the plunger 212, the pressure in conduit 92 is removed and the downward pressure on plunger 212 by piston 224 is eliminated. The fluid pressure from conduit 34 then enters through check valve assembly 44 and moves the plunger 212 to a normally at rest position shown in FIG. 4. Thus, the discharge pump 38 can be utilized to remove a set volume of fluid from the high pressure manifold-actuator system by selectively operating the pump 38.

Figure 5:
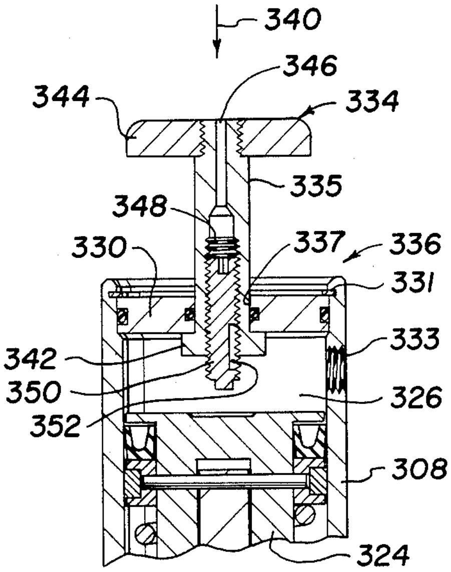
FIG. 5 is a partial sectional view of an alternative embodiment of a positive displacement fluid pump.

FIG. 5 illustrates an alternative embodiment of the input pump. This input pump 336 is identical to the pump 36 shown in FIG. 3 except that the cylinder head design has been changed to facilitate manual operation of the pump 336.

The pump body 308 has an axial port 333 connected to the conduit 90 to provide fluid communication with the actuating chamber 326. A cylinder head 330 is mounted in the upper end of chamber 326 by a snap-ring 331. Suitable seals are mounted in the cylinder head 330 to seal between the cylinder head and pump body 308. The cylinder head 330 has a central bore 337 in which is mounted a handle assembly 334. The handle assembly 334 has a lower body portion 335. The assembly is positioned to axially reciprocate in the forward and reverse direction of arrow 340 in the bore 337. A suitable seal is provided between the body 335 and the bore 337. A shoulder 342 is provided on the body 335 to limit movement of the body 335 in the reverse direction of arrow 340 and to prevent its removal from the head 330. A handle 344 is threadedly engaged onto the upper end of the body 335. The body 335 has an axial port 346 which extends completely through the body 335. The lower end of the port 346 is provided with an enlarged internally threaded counter bore 348. Threadedly mounted within the counter bore 348 is a socket head set screw 350. By inserting a tool through the bore 346, the threaded engagement of the set screw 350 with the body 335 can be adjusted. A suitable seal 352 can be provided on the set screw 350 to seal the threads 348.

As was previously described in regard to the bolt 134 in FIG. 3, the set screw 350 performs a similar function by adjusting the relative threaded engagement of the set screw 350 with the body 335, thereby the upward travel of the piston 324 can be limited.

The embodiment of FIG. 5 provides an additional advantage, in that, if control pressure is lost, the pump can be actuated by forcing the handle 344 downward in the direction of arrow 340 whereby the set screw 350 will engage the upper end of the piston 324 and force the same in the downward direction to cycle the pump. This handle assembly illustrated in FIG. 5 acts as a quick and efficient fail-safe means and can be installed on either the input or discharge pumps.

According to a particular feature of the present invention, the volume of fluid either added to or removed from the system by pumps 36 and 38, respectively, is independent of the pressure in the system created by the forces acting upon the actuator through the valve. Thus, the system provides for incremental positive positioning of the actuator independent of the pressure within the system. By setting the displacement volume of each pump chamber the valve stem 16 can be reliably and repeatedly moved at least as small a distance as five thousandths of an inch. A low pressure power source in the range of 100 psi could be utilized to power the system. In addition, the system is designed to maintain the position of the actuator even though the supply of control signal power pressure or control thereof is lost. It is to be understood, of course, that other means of actuating the pumps could be utilized, such as pneumatic, hydraulic, or electric solenoid actuation. It is to be noted that the volume in the metering chamber is not pressure dependent and the amount of fluid discharged therefrom is therefore constant. In addition, the system provides for presetting the stroke of the plunger in the metering chamber to regulate the amount of fluid added or discharged with each pump stroke, and the number of strokes with which the fluid is discharged over a period of time. Further, the system uses a spring loaded actuator which is failsafe in that if fluid supply is lost, it will move the valve to its normally closed position.

It is to be appreciated, of course, that the foregoing description relates only to a particular preferred embodiment of the present invention and that numerous alterations and changes could be made in the invention as disclosed herein without departing from the spirit and scope of the claims as appended hereto.

I claim:

1. In a fluid control system for use in controlling the position of a follower such as a valve or the like comprising:

a closed fluid manifold containing a fixed volume of fluid;

a variable volume actuator connected in fluid communication to said manifold;

means operably connected to said actuator for resiliently biasing said actuator;

means coupling the follower to said actuator to selectively and precisely move said follower in response to changes in volume in said actuator whereby said follower is moved precisely as the fluid is added to or removed from said manifold; and a first fluid pump for selectively adding a set volume of fluid to said manifold thereby to move said follower a predetermined distance in one direction;

a second fluid pump for selectively removing a set volume of fluid from said manifold thereby to move said follower a predetermined distance in the opposite direction;

said first and second pumps each comprising a pump body defining a fixed volume chamber including a reciprocable plunger disposed therein, supply-discharge means for supplying fluid to said chamber and for discharging fluid from said chamber, reciprocating means for selectively reciprocating said plunger in said chamber to discharge a set volume of fluid from said pump body; and coupling means including said supply-discharge means coupling said first and second pumps to said manifold and for maintaining the set volume added to or removed from said manifold by first and second pumps respectively independent of the fluid pressure in said manifold.

2. The system of claim 1 additionally comprising adjustable stop means for selectively limiting the stroke of said plunger in said chamber whereby the volume discharged by a single stroke of said plunger in said chamber can be varied.

3. The system of claim 1 wherein said pump additionally comprises means to manually reciprocate said plunger.

4. The control system of claim 1 wherein the set volume of fluid added to the fluid manifold by each stroke of said first pump is not equal to the set volume of fluid removed from the fluid manifold by each stroke of said second pump.

* * * * *